Sept. 29, 1931.   B. C. BRIDGHAM   1,824,763
PERCOLATOR
Filed Feb. 10, 1930
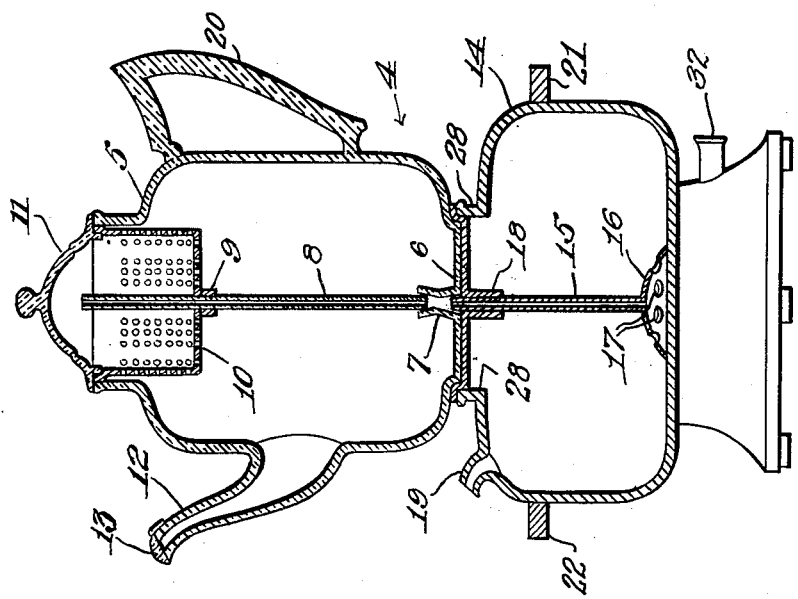
INVENTOR,
BARTON C. BRIDGHAM
BY
ATTORNEY.

Patented Sept. 29, 1931

1,824,763

UNITED STATES PATENT OFFICE

BARTON C. BRIDGHAM, OF SAN FRANCISCO, CALIFORNIA

PERCOLATOR

Application filed February 10, 1930. Serial No. 427,270.

The present invention relates to improvements in percolators, and more particularly to those adapted for use in coffee-making in sealed vessels under conditions preventing the free escape to atmosphere of the volatile essential oils so necessary to its aroma and flavor.

The primary object of the present invention is to provide a percolator to be used in making coffee, wherein the percolations are retained in a vessel separate and distinct from the one supplying the hot water, and are not allowed to be returned to the latter vessel for repercolation again and again, as is the usual practice.

In the accompanying drawing, forming a part of this specification, and in which similar characters of reference refer to like parts, throughout:

The figure is a vertical sectional view of a percolator embodying the principles of my invention, showing the lower vessel constituting the source of hot water supply and bearing its section of percolator tubing provided with a base support, the upper vessel, or urn, in which the percolations are received and retained, the section of percolator tubing through which communication between the two vessels is completed, the perforated coffee container upon the contents of which the hot water received from the lower vessel through the intercommunicating sections of percolator tubing is discharged, the perforated coffee container and the means for its support as borne by the final section of the percolator tubing, the weighted hinged closure borne by the mouth of the pouring spout, the lid, or covering, for the upper vessel, or coffee urn, and the flanged base-plate, or diaphragm, serving both as a covering for the lower vessel and a support upon which the upper vessel rests.

Referring more particularly to the drawing, the numeral 4 indicates, in a general way, a percolator embodying the principles of my invention, comprising in combination a coffee urn, or upper vessel 5 provided with a bottom 6 having a centrally arranged and inwardly extending tubular member 7 adapted to receive a snugly fitted extremity of a section 8 of a percolator tubing bearing near its upper end an annular support 9 upon which rests the base of the perforated coffee retaining member 10, the urn 5 being further provided with a lid 11, a spout 12 having a closure 13 adapted to serve as a safety means in the event of undue pressure accumulating within the urn, and a means 20 for convenience in handling it; and a lower vessel 14 provided with a heating element 32, ears 21 and 22 whereby the vessel may be transferred from place to place, a vent 19 for the escape of excess steam from the interior thereof, a flanged plate, or diaphragm, 31 having a centrally arranged and downwardly extending tubular member 18 fitted to receive an extremity of a second section 15 of a percolator tubing serving as an intercommunicating means between the lower and upper vessels and supported by a concave base 16 bearing perforations 17, the plate serving additionally as a lid for the top-opening in the lower vessel and as a base or support for the upper one.

Though any suitable material may be employed in the making of the percolator, it is preferred that a glass of a character to be unaffected by heat of a reasonable temperature be used in the construction of both vessels, including all parts of the percolator system, since this construction permits observation, at all periods, of the percolating process and enables it to be stopped at any stage desired.

The invention resides in the manner of association of the two vessels comprising the percolator combination, including the sectional character of the percolator tubing, and the ready assemblage and disassemblage of the various parts entering into its structure.

Having thus described my invention, I claim and desire to secure by Letters Patent of the United States, the following:

1. In a device of the character described, two open mouthed vessels in superposed relation, the upper of which is provided with an imperforate bottom bearing centrally thereof a tubular member extending interiorly and upwardly thereof, a section of percolator tubing having an extremity adapted to be received by and to be detachably supported within said tubular member, a perforated coffee receptacle detachably supported by the upper extremity of said section of percolator tubing, a lid for the top opening of said upper vessel, a discharge spout, a pressure-governing means borne by said spout, and a cover for the lower of said vessels in superposed relation, said cover comprising a flanged removable plate bearing centrally a downwardly projecting tubular member in registration with said tubular member borne by the superposed of said vessels.

2. In a device of the character described, two open mouthed vessels in superposed relation, the upper of which is provided with an imperforate bottom bearing centrally thereof a tubular member extending interiorly and upwardly thereof, a section of percolator tubing having an extremity adapted to be received by and to be detachably supported within said tubular member, a perforated coffee receptacle detachably supported by the upper extremity of said section of percolator tubing, a lid for the top opening of said upper vessel, a discharge spout, a pressure-governing means borne by said spout, a cover for the open top of the lower of said vessels comprising a flanged removable plate bearing centrally a downwardly projecting tubular member in registration with the tubular member borne by the bottom of said upper vessel, and a vent for the escape of access steam from the lower of said vessel.

3. In a device of the character described, a pair of open mouthed vessels in superposed relation, the upper of which is provided with an imperforate bottom bearing centrally an upwardly extending tubular member, a section of percolator tubing having an extremity adapted to be received and sustained within said tubular member, a perforated coffee receptacle detachably supported by the other extremity of said section of tubing, a lid for the top opening of upper vessel, a discharge spout therefor, a pressure-governing means borne by said spout, a cover for the open top of the lower of said vessels comprising a flanged removable plate bearing centrally a downwardly projecting tubular member in registration with the tubular member borne by the bottom of said upper vessel, a vent carried by the lower of said vessels for the escape of excess steam, and a second section of percolator tubing borne centrally within said lower vessel, the one extremity of which is supported by a perforated concave base and the other fitted to be received by and enter both of said centrally arranged tubular members.

4. In a device of the character described, a pair of open topped superposed vessels, the bottom of the upper of which serves as a closure for the lower one, an intercommunicating tubular means borne by the bottom of the upper vessel, a telescopic tubular member carried by the upper section of said tubular intercommunicating means, a second telescopic tubular member carried by the lower section of said tubular intercommunicating means and provided with a perforated concave base.

5. The combination, with a pair of open mouthed vessels in superposed relation, the upper of which bears centrally an upwardly extending tubular member, of a flanged removable plate bearing a downwardly extending tubular member adapted for registration with said first mentioned tubular member, said plate serving as a covering for said lower vessel's open mouth and also as a seat for said upper vessel, and an intercommunicating means between said two vessels comprising a section of tubing borne respectively by each of said vessels and united by the two said tubular members, the tubular section borne by the upper vessel being provided with a coffee receptacle and the tubular section borne by the lower vessel with a supporting base.

In testimony whereof I affix my signature.

BARTON C. BRIDGHAM.